United States Patent
Baines et al.

(10) Patent No.: US 11,694,640 B2
(45) Date of Patent: Jul. 4, 2023

(54) SYSTEM FOR DISPLAYING INFORMATION TO A USER

(71) Applicant: Max-Planck-Gesellschaft zur Förderung der Wissenschaften e.V., Munich (DE)

(72) Inventors: Ivan C. Baines, Dresden (DE); Moritz Kreysing, Dresden (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 17/506,750

(22) Filed: Oct. 21, 2021

(65) Prior Publication Data

US 2022/0044646 A1   Feb. 10, 2022

Related U.S. Application Data

(63) Continuation of application No. 16/976,868, filed as application No. PCT/EP2018/055906 on Mar. 9, 2018, now Pat. No. 11,170,723.

(51) Int. Cl.
*G09G 3/34* (2006.01)
*G02B 27/01* (2006.01)
(Continued)

(52) U.S. Cl.
CPC ....... *G09G 3/3406* (2013.01); *G02B 27/0172* (2013.01); *G09G 3/002* (2013.01);
(Continued)

(58) Field of Classification Search
USPC .......................................................... 345/691
See application file for complete search history.

(56) References Cited

U.S. PATENT DOCUMENTS 5,075,789 A  * 12/1991  Jones ................ G09G 3/002
                                                       353/121
6,597,328 B1   7/2003  Stern et al.
(Continued)

FOREIGN PATENT DOCUMENTS

CN   103843334 A   5/2006
CN   103118298 A   5/2013
(Continued)

OTHER PUBLICATIONS

Chinese Office Action dated Mar. 2, 2022, in connection with Chinese Application No. 201880090553.7.
(Continued)

*Primary Examiner* — Chineyere D Wills-Burns
(74) *Attorney, Agent, or Firm* — Troutman Pepper Hamilton Sanders LLP

(57) ABSTRACT

The invention relates to a system for displaying information to a user, comprising:
  an emission device arranged to emit light so as to display information to a user, the emission device being adapted to emit the light in a pulsed manner so that the intensity of the light varies between a high value and a low value,
  a selective viewing device comprising a panel, the panel being adapted so that the user can view the light which is emitted by the emission device through that panel so as to visually perceive the information being displayed, the panel having a variable transparency which can be varied between a state of high transparency and a state of low transparency,
  the system being adapted to synchronize the emission device and the selective viewing device so that the states of the emission device emitting light at a high-intensity value and the states of the panel of the selective viewing device of high transparency overlap in time, (Continued)

the emission device being adapted so that the light is emitted in a pulsed manner with a duty cycle of less than or equal to 1/10, wherein the panel of the selective viewing device is adapted to operate at essentially the same duty cycle.

19 Claims, 5 Drawing Sheets

(51) Int. Cl.
    *G09G 3/00*         (2006.01)
    *G02B 27/00*       (2006.01)
    *H04N 13/00*      (2018.01)

(52) U.S. Cl.
    CPC ............... *G02B 2027/0118* (2013.01); *G02B 2027/0178* (2013.01); *G09G 2320/0247* (2013.01); *G09G 2320/064* (2013.01); *G09G 2320/066* (2013.01); *G09G 2330/021* (2013.01); *G09G 2360/144* (2013.01)

(56) References Cited

U.S. PATENT DOCUMENTS

| | | | |
|---|---|---|---|
| 7,430,018 B1 | 9/2008 | Patel | |
| 8,303,112 B2 | 11/2012 | Jacobs et al. | |
| 8,760,504 B2 | 6/2014 | Ko | |
| 8,933,916 B1* | 1/2015 | Doar | H05B 47/11 345/207 |
| 9,494,800 B2 | 11/2016 | Border et al. | |
| 9,622,326 B1* | 4/2017 | Devyver | G09G 3/3406 |
| 11,170,723 B2* | 11/2021 | Baines | G09G 3/3406 |
| 2005/0093796 A1 | 5/2005 | Fergason | |
| 2007/0091432 A1* | 4/2007 | Garner | H04N 5/74 348/E5.137 |
| 2007/0153122 A1 | 7/2007 | Ayite et al. | |
| 2007/0216868 A1 | 9/2007 | Cashin et al. | |
| 2010/0026970 A1 | 2/2010 | Tanaka | |
| 2011/0017280 A1 | 1/2011 | Rumsby | |
| 2011/0273440 A1 | 11/2011 | Park et al. | |
| 2011/0285831 A1 | 11/2011 | Ohba et al. | |
| 2011/0316850 A1 | 12/2011 | Chen | |
| 2012/0120208 A1 | 5/2012 | Mao | |
| 2012/0194657 A1 | 8/2012 | Ko | |
| 2013/0127980 A1* | 5/2013 | Haddick | G06F 3/013 348/14.08 |
| 2013/0141635 A1* | 6/2013 | Lebens | H05B 45/22 348/370 |
| 2013/0286057 A1 | 10/2013 | Kim et al. | |
| 2014/0002664 A1* | 1/2014 | Hanabusa | H04N 5/04 348/159 |
| 2015/0070742 A1 | 3/2015 | Sorek et al. | |
| 2015/0362772 A1* | 12/2015 | Yoshioka | G09G 3/3611 349/33 |
| 2016/0050736 A1* | 2/2016 | Hoang | F21V 23/005 315/151 |
| 2016/0088292 A1 | 3/2016 | Sakurai et al. | |
| 2016/0216514 A1* | 7/2016 | Hue | G02C 11/10 |
| 2017/0042005 A1 | 2/2017 | Knapp et al. | |
| 2017/0229059 A1* | 8/2017 | Bonnier | G06F 3/017 |
| 2017/0272737 A1 | 9/2017 | Jacobs et al. | |
| 2018/0053284 A1* | 2/2018 | Rodriguez | G06T 3/4007 |
| 2018/0130408 A1 | 5/2018 | Zhou et al. | |
| 2018/0345034 A1* | 12/2018 | Butzloff | A61N 5/0618 |
| 2019/0124741 A1* | 4/2019 | Dickie | G02C 7/102 |
| 2019/0187547 A1* | 6/2019 | Shih | G03B 21/2013 |
| 2020/0410944 A1 | 12/2020 | Baines et al. | |

FOREIGN PATENT DOCUMENTS

| | | |
|---|---|---|
| CN | 102761713 B | 12/2014 |
| CN | 103428519 B | 4/2016 |
| EP | 0913995 A1 | 5/1999 |
| EP | 2169967 A2 | 3/2010 |
| EP | 2365699 A2 | 9/2011 |
| EP | 2375764 A2 | 10/2011 |
| EP | 2378785 A2 | 10/2011 |
| EP | 2416585 A2 | 2/2012 |
| EP | 2432239 A2 | 3/2012 |
| EP | 2445316 A1 | 4/2012 |
| EP | 2477412 A1 | 7/2012 |
| EP | 2574981 A1 | 4/2013 |
| EP | 2610848 A2 | 7/2013 |
| EP | 2730964 A2 | 5/2014 |
| EP | 2869115 A1 | 5/2015 |
| EP | 3046397 A1 | 7/2016 |
| GB | 2420183 A | 5/2006 |
| JP | H02-37388 A | 2/1990 |
| JP | H05-506109 A | 9/1993 |
| JP | H06-110403 A | 4/1994 |
| JP | 2011-249930 A | 12/2011 |
| JP | 2014-153694 A | 8/2014 |
| JP | 2016-065929 A | 4/2016 |
| RU | 2316133 C1 | 1/2008 |
| RU | 2413266 C1 | 2/2011 |
| TW | I478579 B | 3/2015 |
| WO | WO 91/15928 A2 | 10/1991 |
| WO | WO 92/10130 A1 | 6/1992 |
| WO | WO 98/11737 A1 | 3/1998 |
| WO | WO 03/012772 A1 | 2/2003 |
| WO | WO 2004/066620 A1 | 8/2004 |
| WO | WO 2008/021857 A2 | 2/2008 |
| WO | WO 2009/136330 A1 | 11/2009 |
| WO | WO 2010/150973 A1 | 12/2010 |
| WO | WO 2012/096952 A1 | 7/2012 |
| WO | WO 2013/047230 A1 | 4/2013 |
| WO | WO 2013/125077 A1 | 8/2013 |
| WO | WO 2014/174168 A1 | 10/2014 |
| WO | WO 2019/170250 A1 | 9/2019 |

OTHER PUBLICATIONS

Singapore Search Report and Written Opinion, dated Mar. 2, 2022, in connection with Application No. SG11202008116T.
Korean Office Action dated Jun. 24, 2022, in connection with Korean Application No. 10-2020-7028988.
CN 201880090553.7, dated Mar. 3, 2022, Chinese Office Action.
International Search Report and Written Opinion for International Application No. PCT/EP2018/055906 dated Nov. 13, 2018.
International Preliminary Report on Patentability for International Application No. PCT/EP2018/055906 dated May 14, 2020.
English Translation of Decision to Grant and Search Report dated May 26, 2021 in connection with Russian Application No. 2020132273.
Taiwanese Official Letter and Search Report for Application No. 109123065 dated Aug. 3, 2021, and English translation thereof.
Japanese Office Action dated Nov. 4, 2021 in connection with Japanese Application No. 2020-547080, and English translation thereof.
[No. Author Listed], Candela per square metre. Wikipedia. Aug. 20, 2020:3 pages. https://en.wikipedia.org/wiki/Candela_per_square_metre [last accessed Nov. 9, 2020].
[No. Author Listed], High Discharge Current 18650 Rechargeable Cylindrical Lithium Ion Batteries from PowerStream, Sony VTC4 and VTC5, Samsung 25R and Lg HE2, guaranteed genuine. PowerStream. Mar. 27, 2019:4 pages, https://www.powerstream.com/18650-high-discharge-rate.htm [last accessed Nov. 9, 2020].
Devaraj et al., Taxicab tipping and sunlight. PloS one. Jun. 8, 2017;12(6):e0179193.
Farrell et al., Designing flicker-free video display terminals. Displays. Jul. 1, 1988 ;9(3): 115-22.
Rolland et al., The past, present, and future of head-mounted display designs. Proceedings of SPIE International Society for Optics and Photonics, Optical Design and Testing II. Nov. 8, 2004;5638:368-377.
Yetman et al., 2001 electronic buyer's guide. In: Yachting Apr. 2001. Yachting. Apr. 2001; 189:75 pages.

(56) References Cited

OTHER PUBLICATIONS

Brown et al., High Resolution LCD Projector for Extra-Wide Field of View Head-Up Display. Proceedings of SPIE.2003;5080:320-329.
Na et al., Adaptive display luminance for viewing smartphones under low illuminance. Optics Express. Jun. 18, 2015;23(13):16912-16920.

* cited by examiner

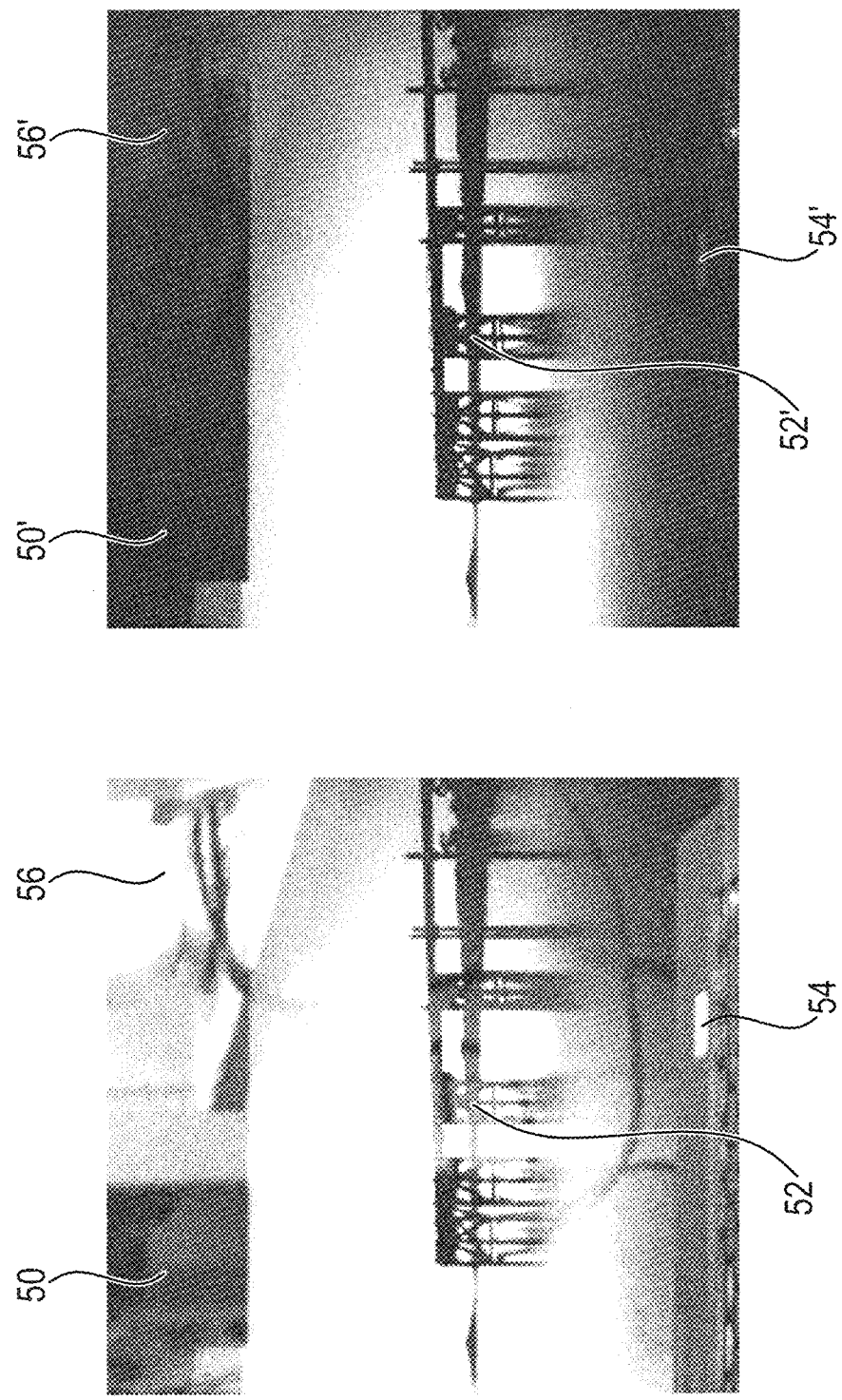

a)

b)

SYSTEM FOR DISPLAYING INFORMATION TO A USER

CROSS REFERENCE TO RELATED APPLICATIONS

This Application is a continuation of U.S. application Ser. No. 16/976,868, filed Aug. 31, 2020, entitled "SYSTEM FOR DISPLAYING INFORMATION TO A USER", which is a national stage filing under 35 U.S.C. 371 of International Patent Application Serial No. PCT/EP2018/055906, filed Mar. 9, 2018, entitled "SYSTEM FOR DISPLAYING INFORMATION TO A USER", each of which is incorporated herein by reference in its entirety.

TECHNICAL FIELD

The present invention relates to a system for the selective viewing and display of images.

TECHNICAL BACKGROUND

It is a common occurrence when using, for example, laptop screens or modern smartphones in brightly lit environments such as, for example, outdoors during the day that often, the brightness of the device is not amenable to reading the content which is displayed. Put simply, ambient light is too bright, compared with the brightness of the screen, to allow for a good contrast. Of course, this could be remedied by moving to an indoor environment or generally a less well-lit environment. However, doing so may not be practical. Further, having to do this reduces the ease of use of the device.

Even indoors, contrast may be reduced for a screen that stands in front of an intensely lit scene, for example, when placed in front of a window, that looks out on a bright summer day. In this case, the viewer may perceive poor contrast when looking at the screen, since the ambient light intensity is too high to comfortably see the content displayed by the screen.

Similarly, reduced contrast may also be experienced due to reflections on the screen itself, if for example bright light from the surrounding is reflected from the screen and masks the displayed information.

One document which (incidentally) relates to this issue is US 2012/0194657 A1, wherein a phenomenon that impacts contrast is explained as described in the following paragraphs: a common purpose of shutter glasses is to enable 3d vision from 2d displays. For this purpose, a pair of shutter glasses, comprising two anti-synchronized individual shutter glass elements, are configured to transmit light to the left and right eye in an alternating fashion, such that two interlaced video signals, one for the left and one for the right eye, are de-interlaced, meaning correctly gated to left and right eye. In simple terms, each shutter glass opens such that the eye behind it (left or right) is exposed to the correct images, while being closed when the incorrect image is shown.

Often, a robust synchronization between the emitting screen and such shutter glasses is facilitated by exploiting short gaps of darkness when switching between left and right images.

These light emission gaps have multiple purposes, including the suppression of artifacts that could be introduced when LCD crystals, that are part of a video screen, reorient between two successive images. For the synchronization of shutter glasses with a video screen, these dark gaps can be beneficial because they can be used to ensure that shutter opening times are long enough to transmit most light per intended image frame whilst not bearing the risk of transmitting light belonging to the prior or subsequent image. Switching shutter glasses in periods of screen darkness can especially be beneficial in cases in which the switching time of the shutter glasses from on to off (or vice versa) were as long as a significant fraction of the entire viewing period.

Typical operating characteristics for such 3D video shutter glasses are 120 Hz emission rate of the video screen, meaning 60 Hz per shutter glass element, which is equivalent to an entire period lasting 16.66 ms, whereas typically opening and closing times may add up to several milliseconds per full period.

While it is easy to see that short dark periods between image frames emitted by the video screen make the gating with slowly reacting shutter glasses more robust, the combination with accurate synchronization means that throughout significant parts of the full viewing period not a single shutter glass is open. As a side effect, ambient light is visibly reduced.

US 2012/0194657A1 explains that this phenomenon can lead to problems in certain low-light environments, in which the user may have problems navigating and that the user may not see obstacles anymore that might be located in a semi-dark domestic environment.

US 2012/0194657A1 proposes to counteract this effect of reduced ambient light by extending the opening times of the shutter glasses beyond the emission times of the display, meaning into the periods of screen darkness. This newer scheme increased the intensity of ambient light compared to the older scheme of precise synchronization, because now the ambient light is gated for longer times than the images to be perceived.

The inventors have realized that the previously reported problem of ambient light reduction at low light intensities, might be turned into an advantage in the context of brighter environments. This becomes possible when identifying and stipulating key parameters far beyond their typically used range, and changing them in a concerted manner.

The inventors have realized that prior art devices also have an unnecessarily large energy consumption, typically due to the light emission devices. In the case of mobile devices (mobile phones, laptops, tablets) this may lead to a reduced battery life and the necessity of frequent battery recharging. Also, an unnecessary power consumption of any light emitting device (including stationary screens) may increase the generation of excess heat which may require the use of hardware intense heat sinks that, together with a high current compatible power source, may increase the form factor of the device.

The present inventors have, however, also found that there are other issues with the prior art technology. In particular, they have found that those devices lead to a poor image contrast.

SUMMARY OF THE INVENTION

The present invention is concerned with at least alleviating at least some of those issues.

The invention is defined by claim 1. Preferred embodiments are defined in the dependent claims.

According to claim 1, a system for displaying information comprises an emission device which is arranged to emit light so as to display information to a user. Such an emission device could, for example, be a computer screen. It could also be a projection device used in, for example, home cinema or public screening environments.

The emission device is adapted to emit the light in a pulsed manner so that the intensity of the light varies between a high value and a low value. Those intensity variations result in brightness variations in the perceived light. By the light being emitted in a pulsed manner, it is meant that in a typically repeating manner, light is emitted at a higher intensity value for some time periods and is, between those time periods, emitted at a lower intensity. The repeat rate of the high intensity pulses is chosen high enough so as to avoid flickering (typically, the repeat rate is higher than 50 Hz).

The system for displaying information further comprises a selective viewing device which comprises a panel. Such a selective viewing device could, for example, be spectacles to be worn by a user, where the glasses of those spectacles would then form the panel. The panel is adapted so that the user can view the light which is emitted by the emission device through that panel so as to visually perceive the information being displayed. The panel has a variable transparency which can be varied between a state of high transparency and a state of low transparency. By high transparency and low transparency, we mean that visible light is either largely blocked, in the state of low transparency, and its transmission through the panel greatly increases in the state of high transparency. Compared with low transparency, the high transparency state refers to a state where the light transmission is at least 50 times higher, preferably at least 500 times higher.

In practical embodiments of the invention, in which the panel comprises LCD shutter glasses, deviations of the time-dependent transmission function from a perfect top hat function might occur so that the boundaries are less sharply defined.

The system is adapted to synchronize the emission device and the selective viewing device so that the states of the emission device emitting light at a high intensity value and the states of the panel of the selective viewing device of high transparency overlap in time. By overlapping, it is meant that they at least occur for some parts of their high-transparency values/high-intensity values simultaneously (i.e. at the same time). By doing so, it is ensured that whenever the emission device emits light at a high intensity value, the selective viewing device is also at a high transparency, thus enabling a viewer to view the emitted light. This allows for selectively viewing the light which is emitted by the emission device whilst blanking out or at least suppressing the light which may be present in the surroundings during the remainder of the time.

The emission device is adapted so that the light is emitted in a periodically repeated pulsed manner with a duty cycle of less than or equal to $\frac{1}{10}$, wherein the panel of the selective viewing device is adapted to operate at essentially the same duty cycle as the emission device. By the duty cycle, we refer to the ratio of the time during which light is emitted at a high-intensity value, compared with the time of the full emission period, which is usually the inverse of the repetition frequency of pulses.

Typically, the intensity of those peaks will fluctuate slightly—i.e., one will not have a perfect top hat function which describes the high intensity emissions. Accordingly, the duty cycle refers to the ratio between those time periods during which the intensity of the emitted light is no less than 90% of the peak intensity which is emitted by that device during a particular repeat period, divided by the full repeat period of those high-intensity peaks. The time periods when the intensity of the light is at a low intensity value are defined by the intensity being less than 50% of the high intensity peak value during that period.

While the preferred implementation uses binary on and off states of the screen, that temporarily match the binary open and closed states of the shutter glasses, respectively, variants of this scheme might also lead to some reduction of contrast. It is essential that a significant fraction of all light emitted during a given period of time, is emitted and gated during one or more short sub-periods of the full period. As a characteristic, the time-dependent emission signal of the screen will have a strongly increased standard deviation compared to shutter glasses operated for 3D vision applications.

Compared with prior art solutions, which imply a basic scheme according to which ambient light is selectively suppressed by spectacles, such that light emitted from a video screen is perceived at higher contrast, the claimed solution provides a higher contrast and/or lower energy consumption and/or imposes less constraints on the wavelength range of light that is being used. Proposed embodiments of these strategies include optical elements and filters tailored to selectively transmit the frequency characteristics of certain light emitting video screens. Specifically, prior art solutions first suggest the rejection of ambient light based on the selective gating of light of certain narrow frequency ranges (wavelength ranges) that are emitted by such video screens. Furthermore, they suggest that the use of video shutter glasses that operate at the same frequency and synchronized with a time-modulated video screen, may improve its contrast, even though the shutter glasses operate at frequencies (typically 50-240 Hz) that are many orders of magnitude lower than oscillation frequencies of the emitted light waves. Subjectively, those images might be viewed at comparatively higher intensities when wearing common shutter glasses, especially when the glasses are synchronized with the emitting video screen.

Problematically and logically in line with description of selective light gating by electromagnetic frequency (wavelength), prior art devices refer to this phenomenon of ambient light reduction as a method of matching the frequency characteristics between an emitting screen and shutter glasses. In doing so, they pay special attention not only to a matching of the precise repetition frequency, but also possible temporal off-set. According to prior art solutions, a possible offset, that may reduce the effect of ambient light reduction, may be minimized by schemes according to which the shutter glasses are being synchronized with the emission time of the screen. As the purpose is not primarily 3D vision in the context of some prior art devices, the prior art devices proposed use a scheme in which the shutter glasses open simultaneously. Opening times per glass, however, remain comparable to the single opening times of 3D shutter glasses, and hence the effect of only modest ambient light attenuation is not significantly altered or enhanced.

While possibly beneficial in some environments, or in combination with gating by wavelength, prior art devices do not allow for an appropriately strong selective attenuation of intense ambient sun light based on shutter glass gating alone.

This means, the prior art devices only enable to reduce ambient light to the same extend described in US 2012/0194657 A1 which described this phenomenon as a problem that may occur under lower light conditions. In particular the prior art devices do not systematically address the problem that intense sunlight (with luminosities most likely exceeding 100.000 lux) can be multiple hundred times brighter than a typical laptop screen, which typically emits with a brightness of less than 500 lx.

The problem of optimizing the contrast enhancement to a degree that video screens have a satisfactory contrast in intense sun-lit environments can also not be achieved by reversing the scheme that the prior art (US 2012/0194657 A1) used to increase the ambient light perceived by the eye. According to such reasoning, one could attempt to use opening times of the shutter that are shorter than the emission times of the screen. This, however, will result in the same contrast as perceived with shutter glasses that are precisely synchronized with emission times, and no further contrast enhancement will be gained.

The inventors have found that the claimed system produces in some embodiments a much better contrast than prior art systems. In particular, the inventors became aware of the importance of having a short duty cycle, which was not previously realized, stipulated and or mentioned by prior art. Further, it is advantageous if during those periods when light is emitted, it is emitted at a higher intensity than for "normal" devices. Accordingly, during those periods, the emitted light is "brighter" in comparison and more easily visible to an observer. Further, since light is only emitted some of the time, energy consumption can be reduced. With the new and claimed solution, what is reported as a disadvantage in US 2012/0194657 A1 is both qualitatively and quantitatively refined and extended such that the disadvantage is turned into an advantage.

The invention relies on a scheme of altering parameters that were not mentioned and or stipulated by prior art solutions.

In line with contrast optimization by matching electromagnetic oscillation frequencies, prior art solutions centrally specified frequency and off-set minimization by a synchronization scheme as important parameters.

One important parameter has no analogue in the domain of wavelength matching, and was therefore possibly not identified to be of high relevance for efficient contrast optimizing by the use of shutter glasses. This is the duty cycle, which specifies the ratio of ON times for one period.

Reducing this duty cycle, which is typically around 40%, to values lower than 10%, preferably lower than 0.5% is the first step toward realizing the invention reported here. This modification alone is able to reduce energy costs of the display illuminating light source by a factor of approximately 4 to 100 fold, in some scenarios it may reduce this energy consumption 500 fold compared to the prior art.

A second parameter whose optimization is favorable to enable the use of video screens in intense sunlight is to strongly increase the intensity of the screen during the duration of an emitting pulse/flash. Whereas ordinary computer screens emit light at typically maximal intensity of 500 lx, or lower, the inventors identified the use of light sources with 100 (preferably 500) times higher intensities to be highly beneficial.

When taken together, the right choice of a duty cycle (a parameter which was not relied on in prior art devices) and the use of high intensity pulses (also not relied on in prior art devices) allows for watching video screens in an intensely sun-lit environment, without introducing the cost of higher energy consumption.

Prior art devices did not focus on these two parameters (duty cycle, pulse intensities). Hence, prior art schemes only reproduce a shutter gated ambient light reduction to the same small degree, that was reported as by US 2012/0194657 A1 before. In particular, prior art devices do not allow for viewing high contrast video screens in intensely sun-lit environments.

A further advantage achieved by the present invention is that the light emitting devices of the system may be downsized. Specifically heat sinks as part of a LED-based light emitting device might be reducible in size due to the fact that the time average intensity and energy consumption may be reduced. Generally, when producing light at high intensities, heat generation can be a major concern. This can cause problems to the light source itself, the electronics as well as the optical elements of the system. Further, when wearing a head mounted device, excessive generation of heat can cause discomfort and even injuries to a user. Since less energy is consumed by the invention described herein, the generation of heat may also be reduced. In certain embodiments of the invention this may allow the downsizing of the system, in particular with respect to the physical dimension of the battery, heat management hardware, and the light source.

In a preferred variant of the present invention, the duty cycle of the emission device is preferably less than or equal to $1/20$, more preferably less than or equal to $1/100$, and even more preferably less than or equal to $1/250$. Such duty cycles improve the viewing experience even more.

In a further preferred variant, the states of the selective viewing device having a high transparency fall within the time period during which the emission device emits light at the high intensity. I.e., the states of the high transparency entirely overlap with the high intensity time periods of the emission device. This ensures that the viewing is particularly efficient, since one only views the emission device when it is emitting light at a high intensity. Accordingly, the influence of light from the surrounding is further decreased.

Alternatively or additionally, it is preferred that the states of the emission device emitting light at a high intensity fall within the time periods during which the selective viewing device has a high transparency. This means that the high-intensity states of the emission device overlap with the time periods during which the selective viewing device has a high transparency so that the states of the high intensity of the emission device do not extend outside of those high-transparency times. This means that the light which is emitted by the light emission device is used particularly efficiently, since it is not emitted when the selective viewing device has a low transparency (when it would then be less easily observable).

In a further preferred embodiment, it is preferred that the states of the emission device emitting light at a high intensity coincide substantially with the time periods during which the selective viewing device has a high transparency. That is, those states, in essence follow the same temporal pattern. By them coinciding substantially, it is meant that preferably no more than 5% of the respective high-intensity states/high-transparency states are outside of the respective other state of the emission device/selective viewing device and in particular not emitted during times during which the transmission function is lower than 50% of the maximum transmission. This combines the advantages recited previously.

In one preferred variant of the present invention, the emission device comprises a screen suitable for use as a computer screen or in a mobile phone, a laptop computer, tablet computer, the screen on the digital camera or a television set, with the screen being adapted to emit the light at a high-intensity value and in a pulsed manner with a peak illuminance greater than 500 lux, preferably greater than 2000 lux, even more preferably greater than 5000 lux, yet more preferably greater than 30,000 lux, even more preferably greater than 100,000 lux, and most preferably greater than 500,000 lux. This illuminance makes sure that the light which is emitted by the emission device can "compete" with surrounding light, in particular sunlight, which itself may be responsible for ambient light levels up to 100,000 lux or higher.

Another preferred variant of the present invention is that the emission device is adapted to project the information onto the surroundings. Compared with the previously described variant of the invention, where the emission device comprises a screen, in a system which has an emission device which is arranged to project the information onto the surroundings, the projector produces the image which is to be viewed by a viewer on some other, typically non-light emitting object (e.g. a wall or a piece of canvas in the case of, say, a cinema). It is on this non-light emitting object that the image to be viewed is formed.

In contrast, in the case of a screen, such as previously described, the screen emits the light and forms the image by itself. The inventors have realized that having a projector, together with the selective viewing device, allows for projecting light onto the surroundings in real-life situations. This could, for example, take the form of an annotated reality system where the projecting device projects information onto the surroundings which may not be visible to a person standing nearby who is not having a selective viewing device. For example, this could take the form of a navigation system where, for example, an arrow is projected onto the pavement to show a person where he or she should go. Thanks to the selective viewing device, this arrow would be much more visible to a person wearing that selective viewing device than to a bystander, thus avoiding disturbing that bystander.

In that context, one variant is that the system is a head-mounted laser projector, with the emission device being a laser light source having a time-averaged optical output power of preferably more than 1 μW and preferably less than 10 mW, more preferably less than 3 mW, even more preferably less than 1 mW, and most preferably less than 100 μW. Such laser projectors ensure that the perceived intensity or brightness is sufficient for viewing in sunlight at least when projecting onto the immediate surroundings of a person using that system. Further, such reduced time-averaged laser emission powers may reduce the laser hazard for bystanders and hence meet laser safety requirements. The laser is emitted in a pulsed rate (with a frequency of typically higher than 20 Hz) so that the peak laser intensities exceed the time-averaged laser power by a factor of higher than 10, preferably higher than 50, most preferably higher than 250. This ensures that the radiation may not be dangerous to a bystander under laser safety regulations whilst allowing for a good viewing contrast.

Another variant is that the system is a head-mounted LED projector, with the emission device being a LED light source having a time-averaged optical output power of more than 1 μW and less than 5 W, preferably less than 250 mW, more preferably less than 10 mW, and most preferably less than 250 μW.

Also here, the LED light is emitted in a pulsed manner (with a frequency of typically higher than 20 Hz) so that the peak intensities exceed the time-averaged emission intensity by a factor of higher than 10, preferably higher than 50, most preferably higher than 250). Again, the invention allows for the light emitted by the projector to compete with the ambient light, whilst also avoiding disturbing bystanders, whilst also avoiding the need for a heavy-weight battery, and/or avoiding the excessive generation of heat. A large battery would lead to a long time during which no recharge is necessary, and it also allows for a high peak current. Accordingly, this embodiment of the invention provides the basis of user-friendly, compact and non-intrusive annotated reality systems.

In the case of projection systems, it each image frame may be sub-divided each image frame into multiple successive images of the base colors, i.e. a red a blue and green frame. In this case, the panel, as part of the invention, may transmit light per displayed sub-frame. In one preferred embodiment, these sub-frames are emitted in a temporally overlapping, or near overlapping manner, such that the panel does not need to be switched to a non-transmitting state between individual sub-frames belonging to one and the same image frame.

A further variant is that the system is arranged for protecting videos in a theatre environment. By this, it is meant that the system is arranged for protecting videos on, for example, the wall of a home cinema environment. However, it is also envisaged that such a projection system can be used in a public screening environment, for example for open-air film screenings as may be frequently held during the summer. It is clear that such systems are much larger scale than the previously described head-mounted systems. The emission device is, in that case, arranged to emit light with a peak luminous flux of more than 10,000 lm, preferably more than 5000 lm, more preferably more than 100,000 lm, and most preferably more than 500,000 lm. Again, this ensures that the system can compete with ambient light, in particular sunlight. Such systems can also be used during the day and are hence hugely advantageous, thanks to the better usability. E.g. if the operator of an open air cinema is able to operate his cinema during the day, it becomes possible to show several times as many movies a day than previously, when one was constrained to only show movies during the hours of darkness. It is evident that this makes it possible to operate an open air cinema much more efficiently.

Noteworthy, as reduced heat production may result from the invention, projection systems that have previously been limited by thermal constraints, may be enabled to operate at higher maximum intensities when pulsed with a particularly short duty cycle as specified by the invention. Because in some cases the increased peak intensities will not fully compensate the reduced duty cycles effect on the time average intensity, the combination with the selective viewing device by the invention, may still lead to a decreased energy consumption while also increasing the contrast.

It is further preferred that the selective viewing device has the form of spectacles, with the panel being one or more of the glasses of the spectacles. Such systems are particularly user-friendly, since they can be easily worn by a wearer.

In some contexts it is also preferred that the emission device in the form of a projection device is incorporated into or attached to the spectacles. This allows for a particularly user-friendly annotated reality device. Further, given that the overall emitted light intensity of the light sources is comparatively low, compared with the prior art, the projection devices previously described can be easily miniaturized and can then be incorporated into spectacles, without the whole system becoming too bulky to wear.

Finally, it may be preferred that the system is arranged so that the emission device synchronizes to the selective viewing device. I.e., using the language of the master/slave relationship commonly used in computer systems, the emission device serves as the slave device to the selective viewing device. This could mean that, for example, a person having or wearing a particular selective viewing device can have all the other emission devices he or she may potentially interact with synchronized to his or her selective viewing device. This improves user comfort.

It is also preferred that the system synchronizes with an externally provided clock, preferably a radio time signal. This allows for several such systems working in unison, which can be good if one wants to ensure that all users of this type of device can perceive the same information. For example, this could be used for selectively displaying information to a group of persons (namely those wearing the corresponding spectacles).

It is also preferred that the system is arranged so that the peak intensity of the light which is emitted is at least as high as the intensity of the surroundings of the emission device and preferably at least 3 times higher than the intensity of the surroundings of the emission device. This allows for a good contrast of the perceived image.

It is particularly preferred if the system further comprises a brightness sensor for sensing the intensity of the surroundings of the emission device. This allows for an automatic adjustment of the system to the intensity of the light in the surroundings.

It is also preferred if the emission device is an LED or laser source utilizing projector that is part of a mobile phone, tablet computer, laptop or other portable electronic device. Such devices combine the advantages mentioned previously with the advantages achieved by such mobile devices.

BRIEF DESCRIPTION OF THE DRAWINGS

FIG. 3' gives another example of the perception of a screen using the invention.

DETAILED DESCRIPTION OF THE DRAWINGS

Figure 1:
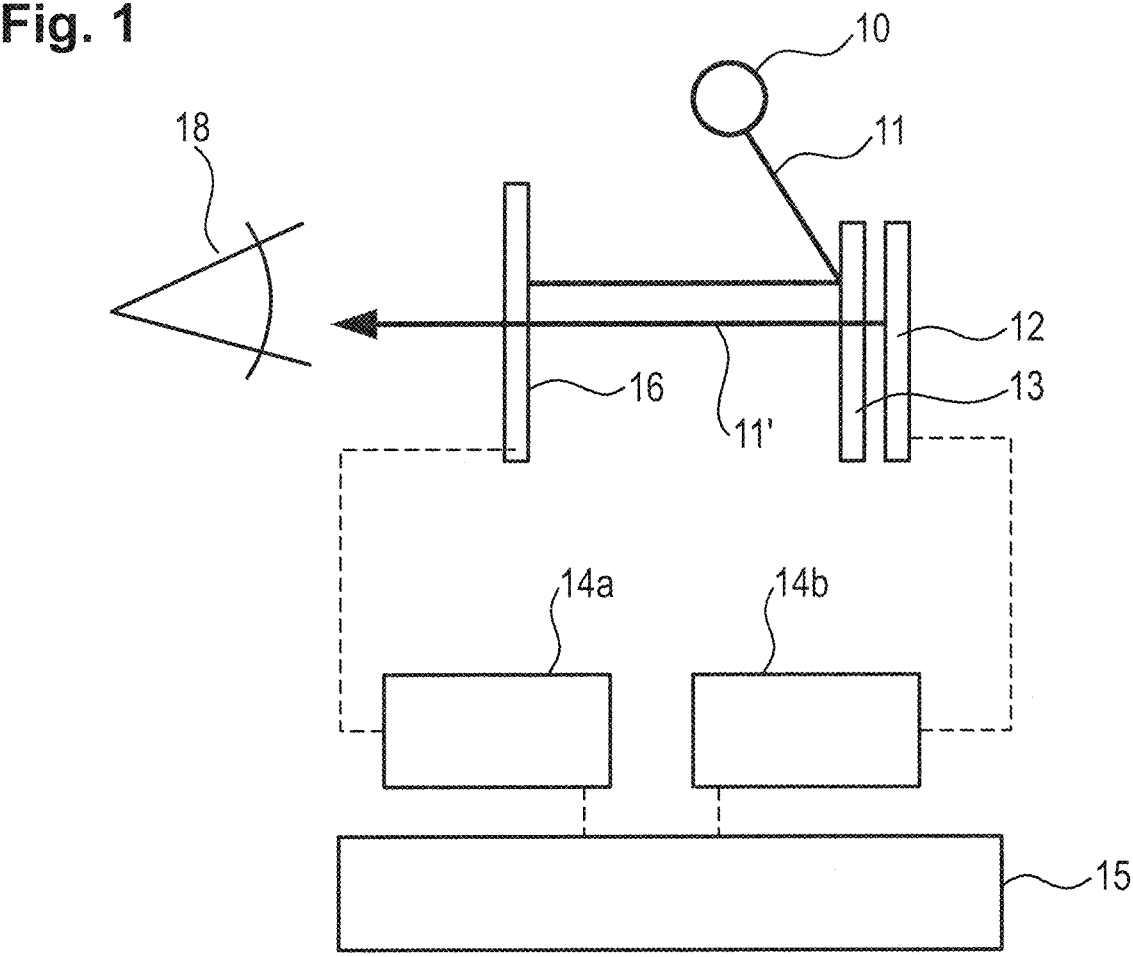
FIG. 1 shows schematically an arrangement of one embodiment of the system.

FIG. 1 shows, schematically, a first embodiment of the present invention. A light source 12 is provided so as to illuminate an LCD matrix 13. Such a light source 12 could be the backlight of a computer screen. Connected to light source 12 is a driver 14b which is, in turn, connected to a function generator 15. This function generator 15 is connected to a second driver 14a which is, in turn, connected to shutter glasses 16. An observer 18 views the image which is produced by light source 12 emitting light 11' which passed through LCD matrix 13. Of note, an ambient light source 10 (e.g. the sun) is also present and emits light 11.

Figure 2:
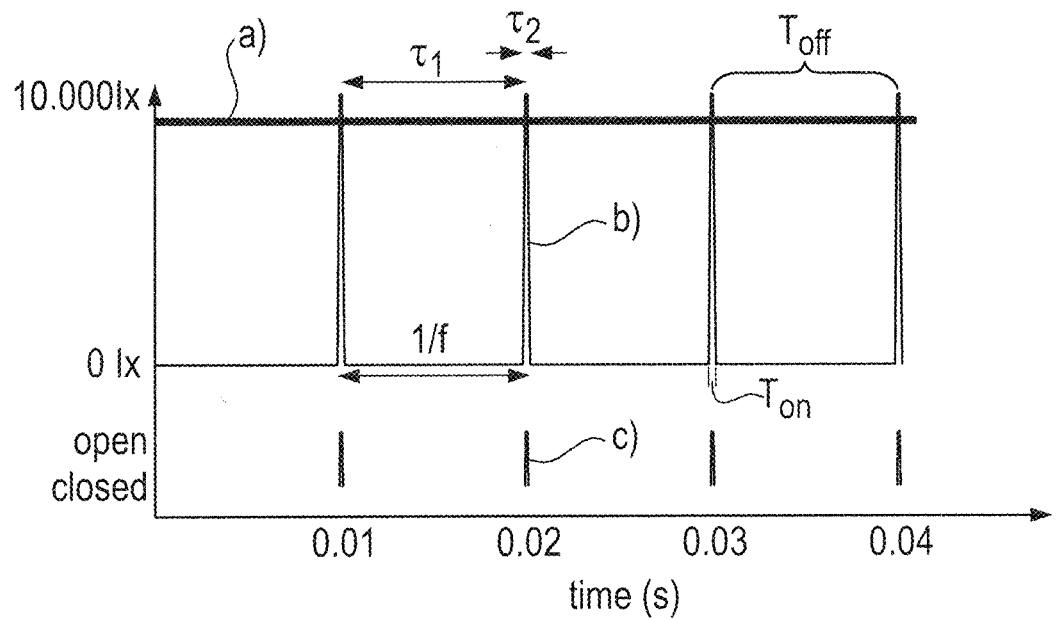
FIG. 2 shows schematically the timing relationship of the selective viewing device and of the emission device.

The shutter glasses 16 are arranged to periodically vary between a high-transparency state and low-transparency state, as is shown in FIG. 2. Here, FIG. 2b) shows the intensity of the light source 12 varies in time. Synchronized with this intensity variation are the shutter glasses 16, as is shown in FIG. 2c), where the label "open" refers to the shutter glasses having a high transparency and where the label "closed" refers to the shutter glasses having a low transparency. In contrast to that, the light emitted by ambient light source 10 is constantly at the same level (cf. FIG. 2a)). By selectively opening the shutter glasses 16 for the light 11' emitted by light source 12 only during those time periods when the shutter glasses 16 have a high transparency, this light 11' is selectively perceived by observer 18. Since human eyes only generally perceive the average light intensity, light emitted by light source 12 is thus primarily observed, also since the light emitted by the light source is, during those time periods when light is emitted at a high intensity, at least as bright or even brighter than ambient light. Consequently, the perceived image contrast is increased and sufficient to enable satisfactory vision of a screen even in environments of high ambient intensity. We also note that the use of a common function generator 15 for first driver 14b and second driver 14a makes synchronizing the shutter glasses 16 and the light source 12 easier to implement. We also note that in FIG. 2c), the time periods are indicated as $T_{on}$ and $T_{off}$ which show the time periods when the shutter glasses have a high transparency ($T_{on}$) and when they have a low transparency ($T_{off}$). In this context, the duty cycle can be defined as T $T_{on}/(T_{on}+T_{off})$. $T_{on}$ is 50 μs, and $T_{off}$ is 0.00995 s, leading to a contrast enhancement of 200.

Figure 3:
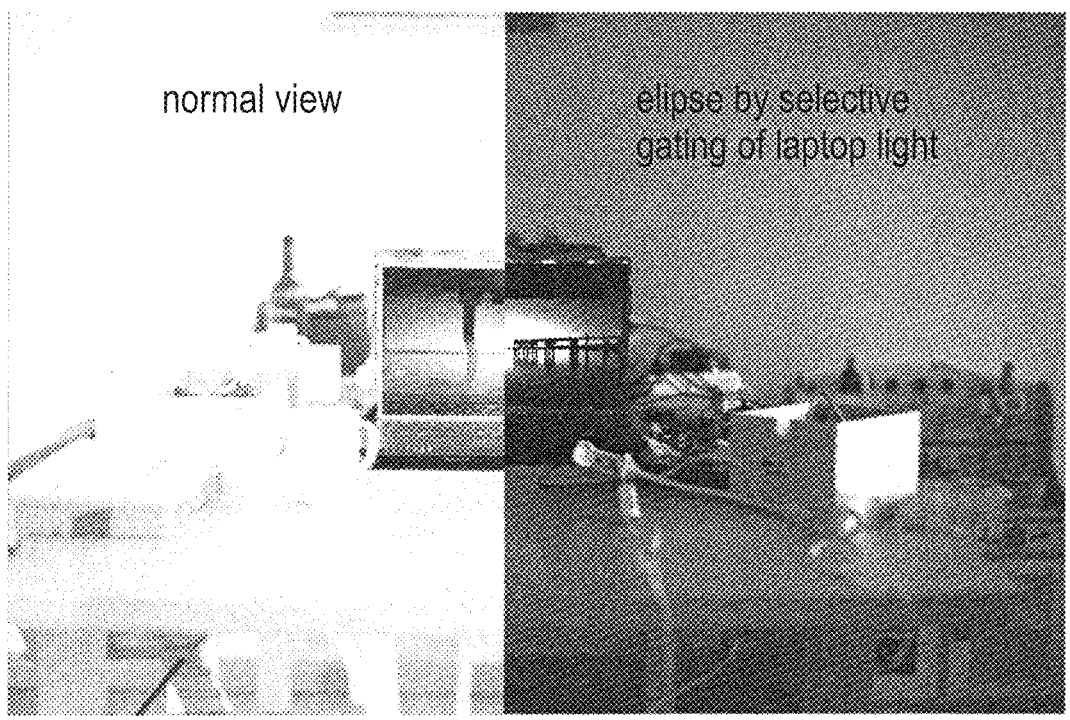
FIG. 3 shows, in a juxtaposition, the perception of a computer screen using a normal view and using the claimed invention.

FIG. 3 shows the results obtained using a prototype system. In the left view, one sees a normal view (i.e. without the inventive technology) of the laptop of one of the inventors in a home environment. Whilst the screen of the laptop can be seen, it is also noticeable that the contrast is not particularly high. Further, it is easily noticeable that the ambient light is much brighter. In the right-hand side of that image, the same environment is shown using the claimed invention. It is noticeable that the ambient light is dimmed to a significant degree and that also, the contrast on the computer screen is much higher. I.e., by selectively "eclipsing" the ambient light and selectively "gating" the laptop light, one achieves a higher contrast of the image to be seen on a laptop screen. In such cases, the screen could serve as a "slave" to the spectacles.

The effects of the invention can also be seen in FIG. 3', which shows photographs of a screen without the invention (photograph 50) and using the invention (screen 50'). As can be seen from photograph 50, there are numerous artifacts (reflections) of the keyboard 54 and of other objects 56 inside the room the screen being viewed is located in. It is clear that these reflections interfere with the perception of bridge 52, which is the object to be viewed. In contrast, photograph 50' shows the same bridge 52', but without the artifacts 54, 56. In fact, as can be seen from the positions corresponding to those artifacts (reference numerals 56', 54'), no artifacts are visible in photograph 50', which uses the invention.

Figure 4:
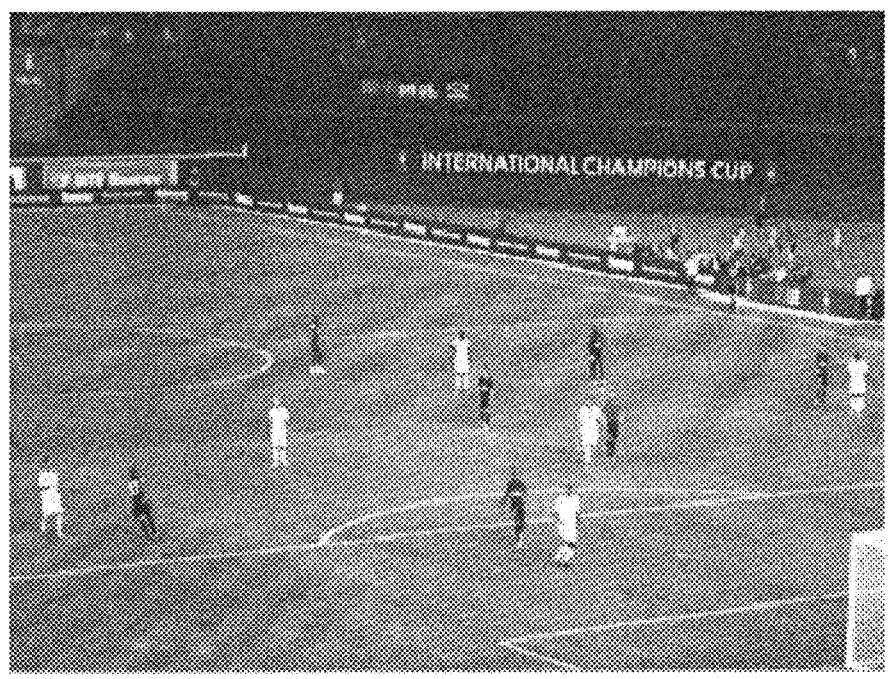
FIG. 4 shows a potential application of the claimed system.
Figure 4:
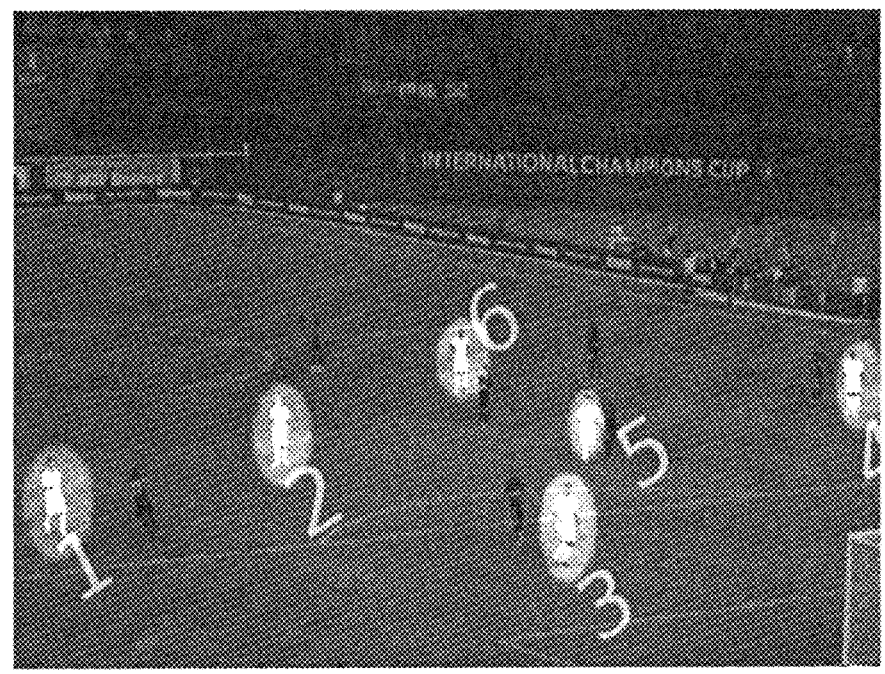

FIG. 4 shows another application of the present invention, namely in an annotated reality environment. FIG. 4a) shows a typical image of a football match. FIG. 4b) shows an annotated reality image of the same football match where the present technology could be applied. In the situation which is shown in FIG. 4, video projectors which selectively illuminate the players of one team only (the team wearing the white jerseys in the present case) would be arranged to emit a light spot which only illuminates those players. Further, the system will also annotate those light spots with the player numbers, as shown in FIG. 4b). Those light spots and annotations would be projected using the pulsed light sources. In such a case, a person who specifically wants to read the information projected next to the players could then wear spectacles constituting selective viewing devices of the present invention, which would be synchronized with the light forming those light spots and annotations. However, those light spots would not be perceivable by a person not wearing those spectacles, given that they would not be able to compete with the ambient light when perceived by the naked eye.

Figure 5:
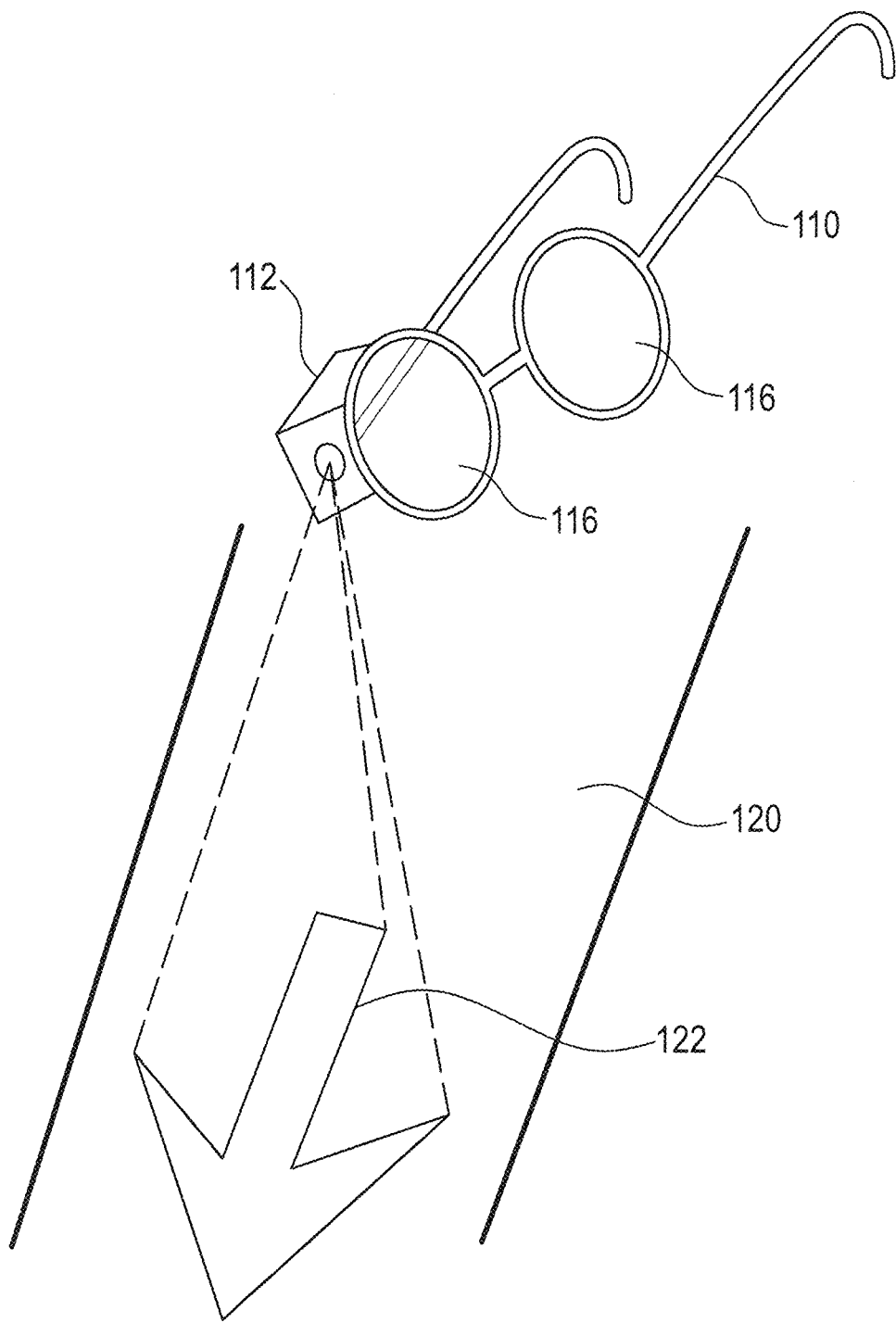
FIG. 5 shows a second embodiment of the invention.

FIG. 5 shows a further embodiment of the invention. In that environment, a projection device 112 is attached to the frame of spectacles 110. There are further provided glasses 116 serving as selective viewing devices which have a transparency which can be varied. Projection device 112 serving as the emission device projects, in the present case, an arrow 122 as an example of some information to be displayed onto pavement 120 (e.g. a visual stimulus as of a navigation system). Projection device 112 emits light in a pulsed manner in the same way previously described for light source 12 so as to project the arrow 122 onto pavement 120. Glasses 116 having time a variable transparency are arranged so as to be synchronized with the light emitted by projection device 112 so as to allow a wearer to selectively perceive arrow 122 on the pavement 120. The repetition frequency for images to be displayed on the pavement may be 50 Hz, and the on time of the projector 0.08 ms during each period, such that the duty cycle of the system is 0.08 ms/20 ms=0.004. Consequently, the invention derived contrast enhancement is 250-fold. In addition to the projection device 112 being integrated into glasses 116, it can also be part of a portable electronic device, such as a mobile phone, tablet computer, laptop, . . . .

The invention claimed is:

1. System for displaying information to a user, comprising: an emission device arranged to emit light so as to display information to a user, the emission device being adapted to emit the light in a pulsed manner so that an intensity of the light varies between a peak value and a low value, a selective viewing device comprising a panel, the panel being adapted so that the user can view the light which is emitted by the emission device through that panel so as to visually perceive the information being displayed, the panel having a variable transparency which can be varied between a state of high transparency and a state of low transparency, the system being adapted to synchronize the emission device and the selective viewing device so that the states of the panel of the selective viewing device of high transparency overlap in time with the states of the emission device emitting light above a high-intensity value, the high-intensity value being less than the peak value, such that the panel of the selective viewing device is at a state of low transparency when the emission device is emitting light at a value below the high-intensity value, and the emission device being adapted so that the light is emitted in a pulsed manner with a duty cycle of less than or equal to 1/10, wherein the panel of the selective viewing device is adapted to operate at essentially the same duty cycle, wherein the emission device is adapted to project the information onto the surroundings.

2. System according to claim 1, wherein the duty cycle of the emission device is less than or equal to 1/20.

3. System according to claim 1, wherein the states of the selective viewing device having a high transparency fall within the time periods during which the emission device emits light at a high intensity, or
  wherein the states of the emission device emitting light at a high intensity fall within the time periods during which the selective viewing device has a high transparency, or
  wherein the states of the emission device emitting light at a high intensity coincide substantially with the time periods during which the selective viewing device has a high transparency.

4. System according to claim 1, the system being a head-mounted laser projector, the emission device being a laser light source for emitting visible laser light and having a time-averaged optical output power of more than 1 µW and less than 10 mW, with peak intensities exceeding a time-averaged laser power by a factor of higher than 10.

5. System according to claim 1, the system being a head-mounted LED projector, the emission device being an LED light source having a time-averaged optical output power of more than 1 µW and a power of less than 5 W, with peak intensities exceeding a time-averaged optical power by a factor of higher than 10.

6. System according to claim 1, the system being arranged for projecting videos in a domestic or theatre environment, the emission device being arranged to emit light with a peak luminous flux of more than 10,000 lumen.

7. System according to claim 1, wherein the selective viewing device has the form of spectacles, with the panel being one or more of the glasses of the spectacles.

8. System according to claim 7, wherein the emission device is incorporated into or attached to the spectacles.

9. System according to claim 1, the system being arranged so that the emission device synchronizes to the selective viewing device.

10. System according to claim 1, wherein the system synchronizes with an externally provided clock.

11. System according to claim 10, wherein the system synchronizes with a radio time signal.

12. System according to claim 1, the system being arranged so that the peak value of the light which is emitted is comparable to the intensity of the surroundings of the emission device.

13. System according to claim 12, further comprising at least one brightness sensor for sensing the intensity of the surroundings of the emission device.

14. System according to claim 12, the system being arranged so that the peak value is greater than a surrounding light intensity.

15. System according to claim 1, wherein the emission device is an LED or laser source utilizing projector that is part of a mobile phone, tablet computer, laptop or other portable electronic device.

16. System according to claim 1, wherein the high-intensity value is at least 90% of the peak value.

17. System according to claim 1, wherein the duty cycle is a ratio between (i) a first time during which the intensity of the emitted light is above 90% of the peak value during a repeat period and (ii) a second time of the repeat period.

18. System for displaying information to a user, comprising: an emission device arranged to emit light so as to display information to a user, the emission device being adapted to emit the light in a pulsed manner so that an intensity of the light varies between a high value and a low value, a selective viewing device comprising a panel, the panel being adapted so that the user can view the light which is emitted by the emission device through that panel so as to visually perceive the information being displayed, the panel having a variable transparency which can be varied between a state of high transparency and a state of low transparency, the system being adapted to synchronize the emission device and the selective viewing device so that the states of the emission device emitting light at a high-intensity value and the states of the panel of the selective viewing device of high transparency overlap in time, and the emission device being adapted so that the light is emitted in a pulsed manner with a duty cycle of less than or equal to 1/10, wherein the panel of the selective viewing device is adapted to operate at essentially the same duty cycle, wherein the emission device is adapted to project the information onto the surroundings, wherein the system is a head-mounted laser projector, and wherein the emission device is a laser light source for emitting visible laser light and having a time-averaged optical output power of more than 1 µW and less than 10 mW, with peak intensities exceeding a time-averaged laser power by a factor of higher than 10.

19. System for displaying information to a user, comprising: an emission device arranged to emit light so as to display information to a user, the emission device being adapted to emit the light in a pulsed manner so that an intensity of the light varies between a high value and a low value, a selective viewing device comprising a panel, the panel being adapted so that the user can view the light which is emitted by the emission device through that panel so as to visually perceive the information being displayed, the panel having a variable transparency which can be varied between a state of high transparency and a state of low transparency, the system being adapted to synchronize the emission device and the selective viewing device so that the states of the emission device emitting light at a high-intensity value and the states of the panel of the selective viewing device of high transparency overlap in time, and the emission device being adapted so that the light is emitted in a pulsed manner with a duty cycle of less than or equal to $1/10$, wherein the panel of the selective viewing device is adapted to operate at essentially the same duty cycle, wherein the emission device is adapted to project the information onto the surroundings, wherein the system is a head-mounted LED projector, and wherein the emission device is an LED light source having a time-averaged optical output power of more than 1 µW and a power of less than 5 W, with peak intensities exceeding a time-averaged optical power by a factor of higher than 10.

* * * * *